US009152450B2

(12) United States Patent
Rosato et al.

(10) Patent No.: US 9,152,450 B2
(45) Date of Patent: Oct. 6, 2015

(54) OFFLOADING SERVICE REQUESTS TO A SECOND GUEST HYPERVISOR IN A LOGICAL PARTITION SHARED BY A PLURALITY OF GUEST HYPERVISORS

(71) Applicant: International Business Machines Corporation, Armonk, NY (US)

(72) Inventors: Matthew J. Rosato, Vestal, NY (US); Steven S. Shultz, Endicott, NY (US); Stephen G. Wilkins, Berkshire, NY (US); Hongjie Yang, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 13/795,348

(22) Filed: Mar. 12, 2013

(65) Prior Publication Data

US 2014/0282499 A1    Sep. 18, 2014

(51) Int. Cl.
*G06F 9/455* (2006.01)
*G06F 9/50* (2006.01)
*G06F 11/34* (2006.01)

(52) U.S. Cl.
CPC ........ *G06F 9/45558* (2013.01); *G06F 9/45533* (2013.01); *G06F 9/5077* (2013.01); *G06F 11/34* (2013.01); *G06F 2009/45575* (2013.01)

(58) Field of Classification Search
None
See application file for complete search history.

(56) References Cited

U.S. PATENT DOCUMENTS

| 7,177,961 | B2 | 2/2007 | Brice, Jr. et al. |
| 7,826,386 | B2 | 11/2010 | Beichter et al. |
| 8,180,877 | B2 | 5/2012 | Das et al. |
| 8,219,988 | B2 | 7/2012 | Armstrong et al. |
| 8,276,155 | B2 | 9/2012 | Ault et al. |
| 8,327,353 | B2 | 12/2012 | Traut |
| 8,656,018 | B1 * | 2/2014 | Keagy et al. ............ 709/226 |
| 2002/0087611 | A1 * | 7/2002 | Tanaka et al. ............ 709/1 |
| 2005/0108712 | A1 * | 5/2005 | Goyal ............ 718/100 |
| 2006/0271544 | A1 * | 11/2006 | Devarakonda et al. ......... 707/9 |
| 2007/0226745 | A1 * | 9/2007 | Haas et al. ............ 718/105 |
| 2008/0077919 | A1 | 3/2008 | Shida et al. |
| 2008/0229031 | A1 * | 9/2008 | Villarreal et al. ............ 711/153 |

(Continued)

FOREIGN PATENT DOCUMENTS

| CN | 1916855 A | 2/2007 |
| CN | 102497410 A | 6/2012 |

OTHER PUBLICATIONS

Turk et al "Virtual Linux Servers Under z/VM: Security, Performance, and Administration Issues", IBM Systems Journal 44.2 (2005), pp. 341-351.

(Continued)

*Primary Examiner* — Emerson Puente
*Assistant Examiner* — Benjamin Wu
(74) *Attorney, Agent, or Firm* — Cantor Colburn LLP; William A. Kinnaman, Jr.

(57) ABSTRACT

Embodiments relate to a method for encapsulating a virtual server in a hypervisor subpartition of a single logical partition to provide additional hardware support and advanced virtualization functions. An aspect includes running a first hypervisor and one or more additional hypervisors over a single logical partition. A request to manage a virtual server is received at the first hypervisor. The request is then analyzed to determine what resources are necessary to manage the virtual server. Based on the analyzed request, one of the first hypervisor or the one or more additional hypervisors is selected to complete the request.

6 Claims, 3 Drawing Sheets

(56) References Cited

U.S. PATENT DOCUMENTS

| | | | |
|---|---|---|---|
| 2009/0089794 A1* | 4/2009 | Hilton | 718/105 |
| 2010/0211958 A1* | 8/2010 | Madison et al. | 718/105 |
| 2010/0332658 A1* | 12/2010 | Elyashev | 709/226 |
| 2011/0209145 A1 | 8/2011 | Chen et al. | |
| 2011/0219372 A1* | 9/2011 | Agrawal et al. | 718/1 |
| 2012/0030673 A1* | 2/2012 | Sakamoto | 718/1 |
| 2012/0102189 A1* | 4/2012 | Burge et al. | 709/224 |
| 2012/0131571 A1* | 5/2012 | Ben-Yehuda et al. | 718/1 |
| 2012/0137291 A1* | 5/2012 | Bacher et al. | 718/1 |
| 2012/0216187 A1* | 8/2012 | Ben-Yehuda et al. | 718/1 |
| 2013/0036323 A1* | 2/2013 | Goose et al. | 714/4.11 |
| 2013/0139159 A1* | 5/2013 | Eidus et al. | 718/1 |
| 2013/0297964 A1* | 11/2013 | Hegdal et al. | 714/2 |
| 2014/0115175 A1* | 4/2014 | Lublin et al. | 709/228 |
| 2014/0123135 A1* | 5/2014 | Huang et al. | 718/1 |

OTHER PUBLICATIONS

UK International Search Report and Written Opinion for Internation Application No. PCT/IB2014/058901; International Filing Date: Feb. 11, 2014; Date of mailing: Jun. 13, 2014; 13 pages.

U.S. Appl. No. 14/501,791; Non-Final Office Action; Date Filed: Sep. 30, 2014; Date Mailed: Jan. 30, 2015; 27 pages.

* cited by examiner

OFFLOADING SERVICE REQUESTS TO A SECOND GUEST HYPERVISOR IN A LOGICAL PARTITION SHARED BY A PLURALITY OF GUEST HYPERVISORS

BACKGROUND

The present invention relates generally to virtual machines, and more specifically, to encapsulating a virtual server in a hypervisor subpartition of a single logical partition to provide additional hardware support and advanced virtualization functions.

Although new hardware is constantly being developed, it may not always be a simple matter to provide support for the new hardware to older systems that manage one or more virtual machines. In some cases, a system may include years' worth of upgrades and modifications, which can make adding new hardware support costly as the support may require modifications to numerous system modules that have been added over the years.

SUMMARY

According to an embodiment of the present invention, a system for encapsulating a virtual server in a hypervisor subpartition of a single logical partition is provided. The system includes a computer processor and logic executable by the computer processor. The logic is configured to implement a method. The method includes running a first hypervisor and one or more additional hypervisors over a single logical partition. A request to manage a virtual server is received at the first hypervisor. The request is then analyzed to determine what resources are necessary to manage the virtual server. Based on the analyzed request, one of the first hypervisor or the one or more additional hypervisors is selected to complete the request.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein are directed to encapsulating a virtual server in a hypervisor subpartition of a single logical partition to provide to provide hardware support in situations where hardware support cannot be offloaded to another hypervisor due to the nature of the hardware. A first hypervisor and one or more additional hypervisors are run over a single logical partition according to embodiments. A request to manage a virtual server is received at the first hypervisor. The request is then analyzed to determine what resources are necessary to manage the virtual server. Based on the analyzed request, one of the first hypervisor or the one or more additional hypervisors is selected to complete the request.

Embodiments may address issues that arise when a control program needs to support new hardware or another new resource. In some instances, upgrades to the control program may prove difficult, especially where the control program has already undergone years of upgrades resulting in numerous modules that would need to be modified to provide the new hardware support. Embodiments of this disclosure may provide needed hardware support without costly modification to the control program, by providing a second hypervisor in a single logical partition that supports the desired hardware. As a result, hardware support may be offloaded to the second hypervisor.

However, situations may arise where the hardware support cannot be offloaded due to the nature of the hardware. These may include central processing unit (CPU) and memory support, which must be used directly in order to be efficiently exploited, and input/output (I/O) pass-through devices where the hypervisor is bypassed to allow a virtual server to control the devices directly. According to embodiments, a virtual server may be hosted and run on the second hypervisor subpartition of a single logical partition to support advanced virtualization functionality and hardware features that are not supported by a first hypervisor. In this manner, overhead may be minimized, parallelism may be maximized, and new hardware may be added with significantly reduced costs.

Figure 1:
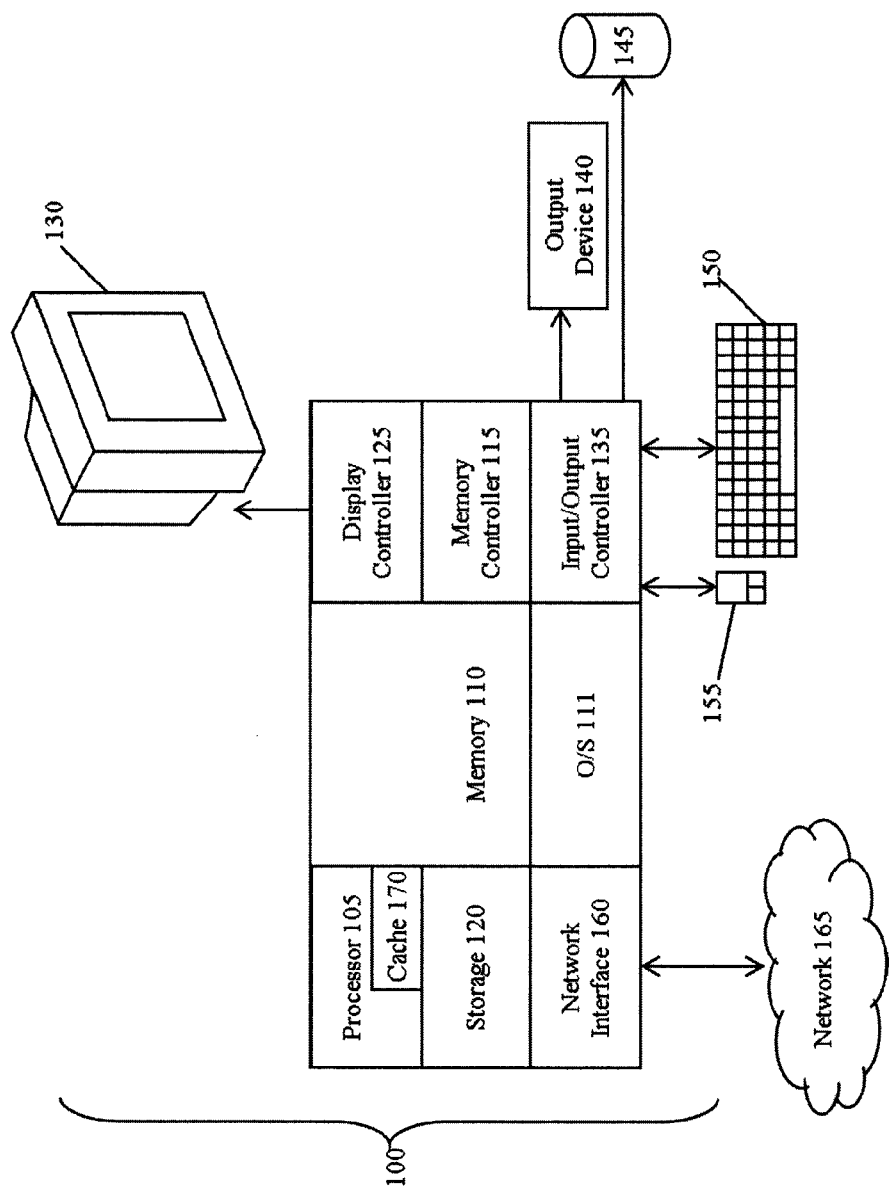
FIG. 1 depicts a block diagram of a computer system according to an embodiment.

FIG. 1 illustrates a block diagram of a computing device 100 embodiment for use in practicing the teachings of this disclosure. The methods described in this disclosure may be implemented in hardware, software (e.g., firmware), or a combination thereof. In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications. Further, the local interface may include address, control, or data connections to enable appropriate communications among these components.

The processor 105 is a hardware device for executing hardware instructions or software, particularly those stored in memory 110. The processor 105 may be any custom made or commercially available processor, a central processing unit (CPU), an auxiliary processor among several processors associated with the computer 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The system 100 may further include a display controller 125 coupled to a display 130. In an exemplary embodiment, the system 100 may further include a network interface 160 for coupling to a network 165. The network 165 may be an IP-based network for communication between the computer 100 and any external server, client and the like via a broadband connection. The network 165 transmits and receives data between the computer 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 2:
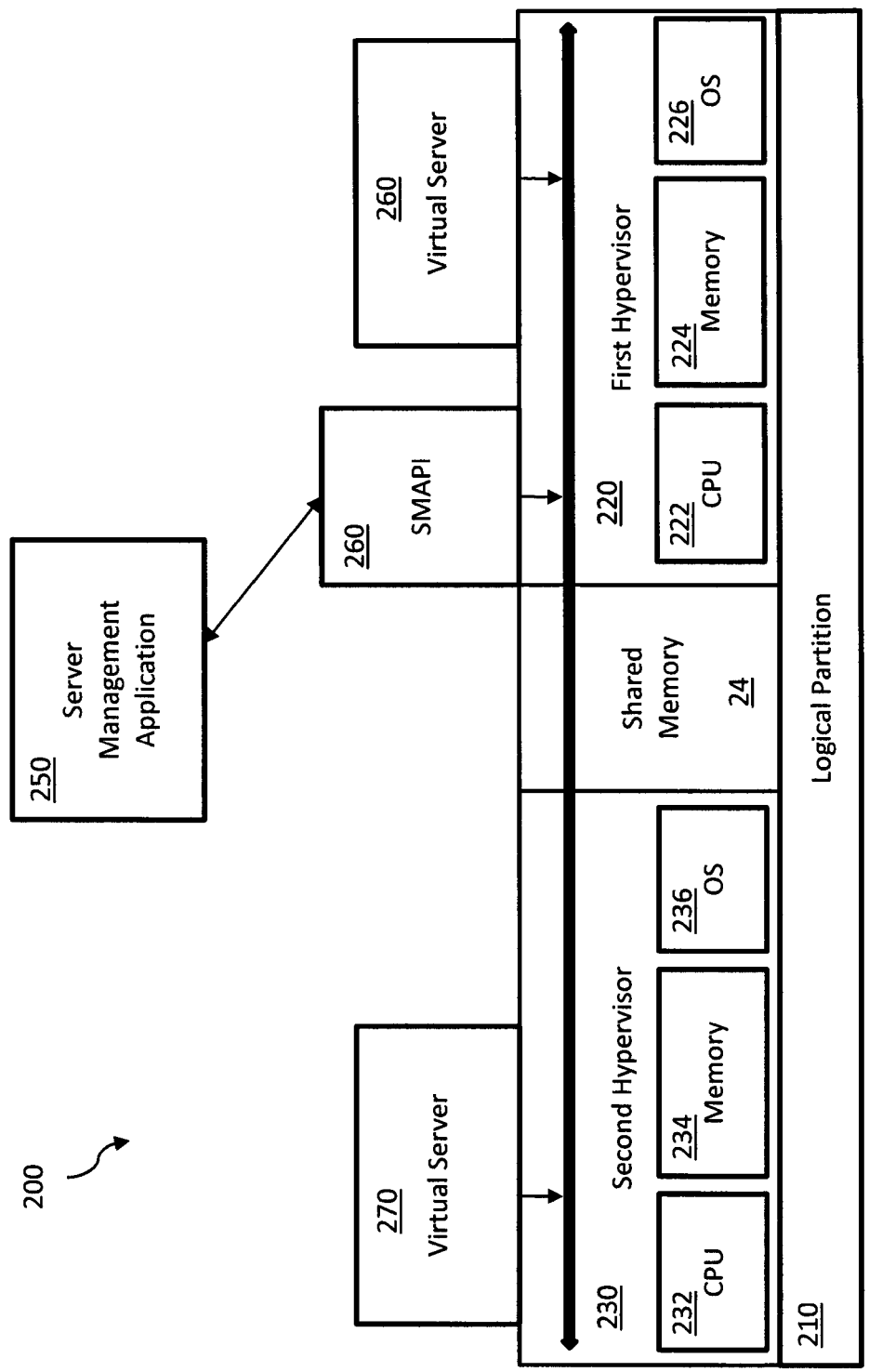
FIG. 2 depicts a block diagram of a subpartitioned system according to an embodiment.

FIG. 2 illustrates a schematic diagram of an exemplary embodiment of the disclosed subpartitioned system 200. As shown, the system 200 may include a logical partition 210, first hypervisor 220, a second hypervisor 230, and a shared set of memory 240.

Both the first hypervisor 220 and the second hypervisor 230 may run over the same logical partition 210. According to other embodiments, the logical partition 210 is not limited to the first hypervisor 220 and the second hypervisor 230, and may comprise more than two hypervisor subpartitions. The logical partition 210 may represent all or a subset of the hardware existent on a computer system (such as the system 100 shown in FIG. 1), virtualized as a distinct computer. The logical partition 210 may provide one or more processors and a set of memory to the hypervisors 220 and 230.

Conventionally, no more than a single hypervisor runs over a logical partition. The hypervisor accesses the hardware of the host computer system through the logical partition. As such, the hypervisor can host one or more guest virtual machines, which each behave as if they have their own hardware.

According to one embodiment shown in FIG. 2, a first hypervisor 220 and a second hypervisor 230 may both run over the same logical partition 210. As described further below, despite sharing the logical partition 210, the first hypervisor may have its own one or more central processing units (CPUs) 222, memory 224, and first operating system 226. The second hypervisor may likewise have its own CPU 232, memory 234, and second operating system 236.

In an exemplary embodiment, the first operating system 226 and the second operating system 236 may be different operating systems. For example, and not by way of limitation, the first operating system 226 may be a version of Windows™ while second operating system 236 may be a version of Linux™. Because of the open source nature of Linux, new hardware support may become available quickly and at little cost to the system administrator through the Open Source Community, making this operating system a beneficial choice in some embodiments. It will be understood, however, that other operating systems may be used in addition, or alternatively, to Windows and Linux.

The first hypervisor 220 may have one or more virtual servers 260 running on top of it. The virtual server 260 or the first hypervisor 220 may desire access to resources not supported by the first operating system 226. In this case, however, such resource may be supported by the second operating system 236, which may support such a resource. The resources may include hardware resources, where the first operating system is unable to support the appropriate drivers, e.g., printer driver, small computer system interface (SCSI) drivers, or flash drivers.

In some instances, the second operating system 236 may support resources that are not supported by the first operating system 226. In fact, in some exemplary embodiments, the second hypervisor 230 may be initialized and its operating system 236 chosen specifically to support offloaded resources that are unsupported by the first operating system 226. In that case, the first hypervisor 220 may access resources its operating system 226 does not support by passing messages to the second operating system 236, which does support such resources.

Situations may arise where hardware support cannot be offloaded to the second hypervisor 230 due to the nature of the hardware. For example, situations where hardware support cannot be offloaded may include CPU/memory support, which must be used directly by a virtual server in order to be efficiently exploited, and input/output (I/O) pass-through devices where a hypervisor is bypassed to allow a virtual server to control the devices directly. According to an exemplary embodiment, one or more virtual servers 270 may be instantiated through the first hypervisor 220 and hosted on the second hypervisor 230. By running a virtual server 270 on the second hypervisor 230, support is provided for advanced virtualization functionality and hardware features that are not supported by the first hypervisor 220 and could not be previously offloaded with efficiency. According to an embodiment, by running a virtual server 270 on the second hypervisor 230, advanced virtualization may be provided such as virtual machine suspend/resume functionality. Thus, according to an embodiment, the second hypervisor subpartition 230 may be utilized to host a virtual server 270 instantiated through the first hypervisor 220 in addition to merely offloading resources.

Communications between the first and second hypervisors 220 and 230, and their respective operating systems 226 and 236, may occur through the shared memory 240. As discussed above, each hypervisor 220 and 230 may have access to its own memory 224 and 234. Data placed by the first hypervisor in the first memory 224 may be inaccessible to, or not accessed by, the second hypervisor 230. Likewise, data placed by the second hypervisor in the second memory may be inaccessible to, or not accessed by, the first hypervisor. Data in the shared memory 240, however, may be accessible by both the hypervisors 220 and 230. Thus, the first hypervisor 220 may communicate with the second hypervisor by writing data to the shared memory 240, and likewise, the second hypervisor may communicate with the first hypervisor by writing data to the shared memory 240.

In an exemplary embodiment, a server management application 250 may issue a request for a virtual server definition and/or activation via a system management application program interface (SMAPI) 260 of the first hypervisor 220. When the request for virtual server definition and/or activation comes into the SMAPI 260, the request is analyzed for resources necessary to construct or activate the virtual server 270. Based on the analyzed request, a determination is made as to whether the virtual server 270 requires resources available only on the second hypervisor 230 or could be instantiated on the second hypervisor 230 according to an embodiment.

According to an embodiment, if the virtual server 270 requires resources available only on the second hypervisor 230, then the virtual server 270 is defined or instantiated on the second hypervisor 270. According to another embodiment, if the virtual server 270 could be instantiated on the second hypervisor 230, the load on the computer system 200 is analyzed to determine the best placement of the virtual server 270, with the virtual server subsequently being instantiated on the appropriate hypervisor based on that analysis.

Once the virtual server 270 is instantiated on the second hypervisor subpartition 230, the virtual server 270 naturally takes advantage of the CPU and memory resources available to the second hypervisor 230. In addition, the virtual server 270 running on the second hypervisor 230 of an embodiment may exploit I/O pass-through devices as they are intended. That is, by allowing the subpartition to be largely bypassed in favor of direct virtual server control. Using the second hypervisor 230 to host virtual servers may also allow for maximum utilization of second hypervisor 230 controlled resources, thus more efficiently utilizing both the resources designated for the first hypervisor 220 and those of the second hypervisor 230. An embodiment further allows resources that are capable of being on both the first hypervisor 220 and the second hypervisor 230 to be reapportioned to accommodate a system load.

Subsequent to the defining or instantiation of the virtual server 270 on the second hypervisor 230, the virtual server 270 has little to no interaction with the first hypervisor 220. However, the virtual server 270 may continue to be manipulated by the SMAPI 260, as the SMAPI 260 knows where the virtual server 270 was instantiated and how to control the virtual server 270. According to an embodiment, an end user does not need know anything about how the virtual server 270 is instantiated. The end user may be provided with information about how the virtual server 270 was instantiated and provided with the mechanisms to utilize that knowledge to manipulate the virtual server 270 according to an embodiment.

Figure 3:
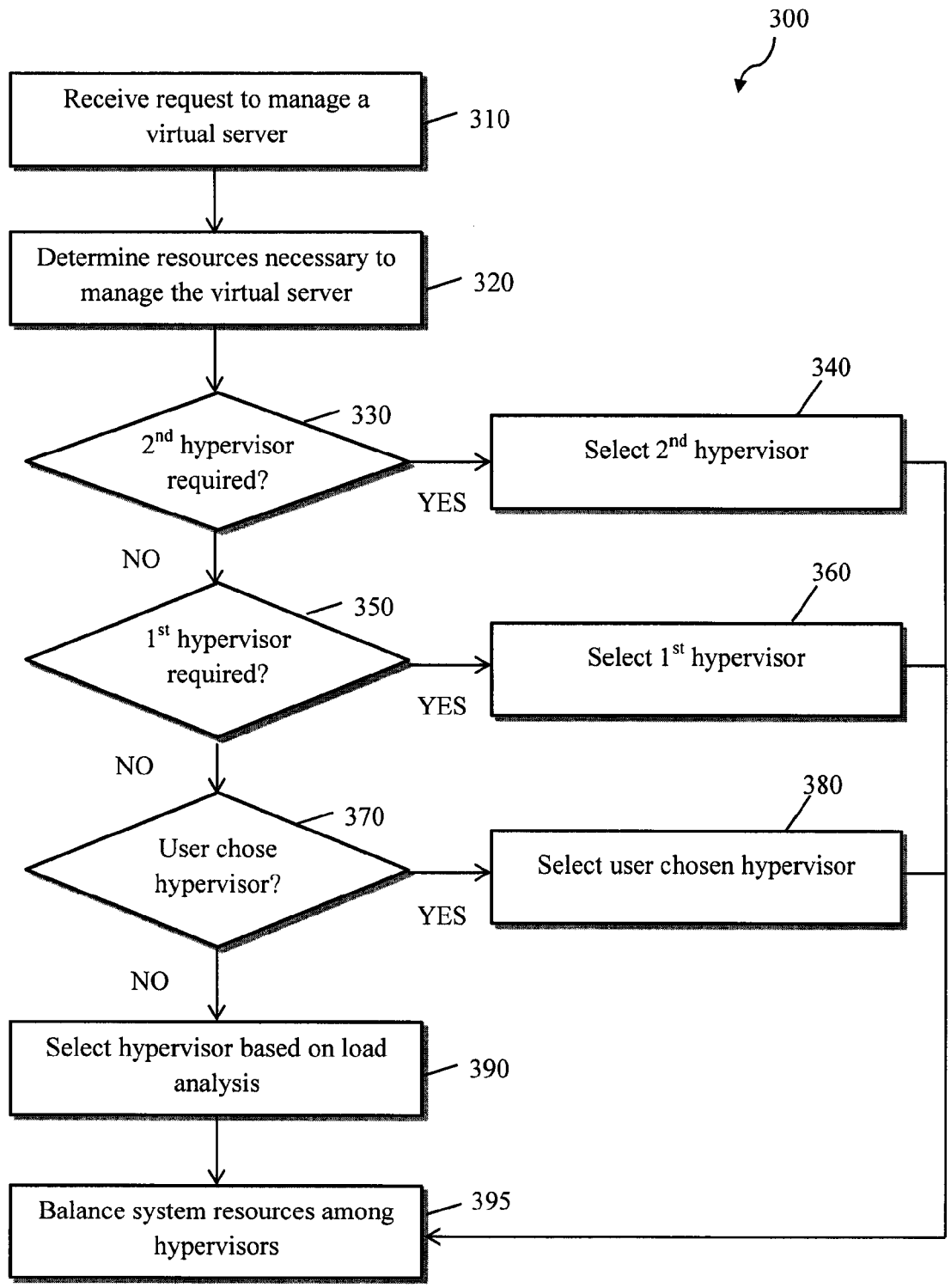
FIG. 3 depicts a flow diagram of a process for selecting a hypervisor subpartition for encapsulating a virtual server according to an embodiment.

With reference to FIG. 3, a process 300 for selecting a hypervisor subpartition for encapsulating a virtual server according to an embodiment is generally shown. According to an embodiment, the first hypervisor subpartition 220 and the second hypervisor subpartition 230 may both run over the same single logical partition 210.

At block 310, a request to manage a virtual server may be received at the first hypervisor 220 according to an embodiment. In an embodiment, a server management application 250 issues the request to the SMAPI 260 of the first hypervisor 220. The request of an embodiment may include virtual server management tasks such as defining the virtual server, activating the virtual server, and updating the virtual server.

At block 320, the request may be analyzed to determine the resources necessary to perform the requested virtual server management task according to an embodiment. Based on the analyzed request, one of the first hypervisor 220 and the second hypervisor 230 may be selected to manage the virtual server. The selection of a hypervisor subpartition to manage the virtual server is discussed in detail with reference to blocks 330-390 of FIG. 3.

At block 330, a determination is made as to whether the requested virtual server management task requires hardware resources supported only on the second hypervisor 230. According to an embodiment, the second hypervisor 230 may be selected responsive to the request requiring resources supported only on the second hypervisor 230, as shown in block 340. According to an embodiment, the second hypervisor 230 may support hardware not supported by the first hypervisor 220. For example, the second hypervisor 230 may support hardware, such as a size of memory, a type of memory, a network device, and/or an I/O pass-through device that may not be supported by the first hypervisor 220.

If the requested virtual server management task does not require hardware resources supported only on the second hypervisor 230, a determination is then made as to whether the requested virtual server management task requires hardware resources supported only on the first hypervisor 220, as shown in block 350. According to an embodiment, the first hypervisor 220 may be selected responsive to the request requiring resources supported only on the first hypervisor 220, as shown in block 360. If the requested virtual server management task does not require hardware resources supported only on the first hypervisor 220, a determination is then made as to whether a user has selected a hypervisor subpartition to manage the virtual server, as shown in block 370. If so, the hypervisor subpartition chosen by the user is selected according to an embodiment, as shown in block 380. If a user has not chosen a hypervisor subpartition, then the hypervisor subpartition may be selected based on the load on the system 200 according to an embodiment.

According to an embodiment, subsequent selecting a hypervisor subpartition (e.g., the first hypervisor 220 or the second hypervisor 230) to manage the virtual server as discussed in blocks 340, 360, 380 and 390, the system resources may be balanced among the hypervisor subpartitions, as shown in block 395. According to this embodiment, the loads on the hypervisor subpartitions are monitored and the resources are dynamically reapportioned among the hypervisor subpartitions to accommodate the loads. In other words, an embodiment further allows resources that are capable of being on both the first hypervisor 220 and the second hypervisor 230 to be reapportioned to accommodate system loads.

According another embodiment, the process 300 for selecting a hypervisor subpartition for encapsulating a virtual server described above may similarly be implemented with one or more additional hypervisor subpartitions running over the logical partition 210.

Technical effects and benefits include providing needed hardware support without costly modification to a control program of a system by providing one or more additional hypervisors in a single logical partition to supports the desired hardware. As a result, hardware support may be off-loaded to the one or more additional hypervisors according to embodiments. According to embodiments, virtual servers may be hosted and run on the one or more additional hypervisors to support hardware features that could are not supported by the first hypervisor and cannot be offloaded to the another hypervisor. In this manner, overhead may be minimized, parallelism may be maximized, and new hardware may be added with significantly reduced costs.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system, comprising:
   a memory having computer readable computer instructions; and
   a processing device for executing the computer readable instructions to perform a method comprising:
     running a first hypervisor over a logical partition;
     running a second hypervisor over the logical partition;
     receiving at the first hypervisor a request to manage a virtual server;
     analyzing the request to determine resources necessary to manage the virtual server; and
     selecting one of the first hypervisor and the second hypervisor to perform the request, wherein access to hardware resources by the first hypervisor and the second hypervisor is via the logical partition and the logical partition represents at least a subset of the hardware resources existent on the computer system virtualized as a distinct computer shared by the first and the second hypervisor.

2. The computer system of claim 1, wherein the selecting further comprises:
   performing the request on the first hypervisor responsive to the request requiring resources supported only on the first hypervisor;
   performing the request on the second hypervisor responsive to the request requiring resources supported only on the second hypervisor; and
   performing the request on a user selected one of the first hypervisor and the second hypervisor responsive to the request further comprising a user selection of the first or second hypervisor.

3. The computer system of claim 1, wherein the selecting further comprises:
   performing the request on a selected one of the first hypervisor and the second hypervisor based on a load analysis of the first and second hypervisor.

4. The computer system of claim 1, wherein the request to manage a virtual server comprises at least one of defining a virtual server, activating a virtual server, and updating a virtual server.

5. The computer system of claim 1, wherein the second hypervisor supports a hardware resource not supported by the first hypervisor, the hardware resource not supported by the first hypervisor comprising a selected one of a size of memory, a type of memory, a resource, a network device, and an input/output pass-through device.

6. The computer system of claim 1, further comprising:
   monitoring loads on the first hypervisor and the second hypervisor; and
   dynamically reapportioning resources among the first hypervisor and the second hypervisor to accommodate the loads.

* * * * *